(12) United States Patent
Chang et al.

(10) Patent No.: US 12,039,244 B2
(45) Date of Patent: Jul. 16, 2024

(54) HYBRID NODE CHIPLET STACKING DESIGN

(71) Applicant: Taiwan Semiconductor Manufacturing Company, Ltd., Hsin-Chu (TW)

(72) Inventors: Jen-Yuan Chang, Hsinchu (TW); Jheng-Hong Jiang, Hsinchu (TW); Chin-Chou Liu, Hsinchu County (TW); Long Song Lin, Taipei (TW)

(73) Assignee: TAIWAN SEMICONDUCTOR MANUFACTURING COMPANY, LTD, Hsinchu (TW)

( * ) Notice: Subject to any disclaimer, the term of this patent is extended or adjusted under 35 U.S.C. 154(b) by 60 days.

(21) Appl. No.: 17/752,474

(22) Filed: May 24, 2022

(65) Prior Publication Data
US 2023/0041839 A1 Feb. 9, 2023

Related U.S. Application Data

(60) Provisional application No. 63/230,224, filed on Aug. 6, 2021.

(51) Int. Cl.
*G06F 30/392* (2020.01)
*G06F 30/27* (2020.01)
*G06F 115/02* (2020.01)
*G06F 115/12* (2020.01)
*G06F 119/18* (2020.01)

(52) U.S. Cl.
CPC ............ *G06F 30/392* (2020.01); *G06F 30/27* (2020.01); *G06F 2115/02* (2020.01); *G06F 2115/12* (2020.01); *G06F 2119/18* (2020.01)

(58) Field of Classification Search
USPC ........................................................ 716/119
See application file for complete search history.

(56) References Cited

U.S. PATENT DOCUMENTS

| 6,555,902 B2 * | 4/2003 | Lo ................. | H01L 25/0652 |
| | | | 257/773 |
| 10,937,762 B2 | 3/2021 | Lin et al. | |
| 2022/0238328 A1 * | 7/2022 | Devilliers ........... | H01L 21/0274 |

FOREIGN PATENT DOCUMENTS

| TW | 201701432 A | 1/2017 |
| TW | 202101684 A | 1/2021 |
| TW | 202129894 A | 8/2021 |

* cited by examiner

*Primary Examiner* — Bryce M Aisaka
(74) *Attorney, Agent, or Firm* — HAYNES AND BOONE, LLP

(57) ABSTRACT

The present disclosure is directed to methods for generating a multichip, hybrid node stacked package designs from single chip designs using artificial intelligence techniques, such as machine learning. The methods disclosed herein can facilitate heterogenous integration using advanced packaging technologies, enlarge design for manufacturability of single chip designs, and/or reduce cost to manufacture and/or size of systems provided by single chip designs. An exemplary method includes receiving a single chip design for a single chip of a single process node, wherein the single chip design has design specifications and generating a multichip, hybrid node design from the single chip design by disassembling the single chip design into chiplets having different functions and different process nodes based on the design specifications and integrating the chiplets into a stacked chip package structure.

20 Claims, 10 Drawing Sheets

HYBRID NODE CHIPLET STACKING DESIGN

This is a non-provisional application of and claims benefit of U.S. Provisional Patent Application Ser. No. 63/230,224, filed Aug. 6, 2021, the entire disclosure of which is incorporated herein by reference.

BACKGROUND

The semiconductor integrated circuit (IC) industry has experienced rapid growth. Continuing advances in semiconductor manufacturing processes have resulted in integrated circuits ("ICs") having semiconductor devices with finer features and/or higher degrees of integration. Functional density (i.e., the number of interconnected devices per IC chip area) has generally increased while feature size (i.e., the smallest component that can be created using a fabrication process) has decreased. This scaling-down process generally has generally provided benefits by increasing production efficiency and lowering associated costs.

Advanced IC packaging technologies have been developed to further reduce density and/or improve performance of ICs, which are incorporated into many electronic devices. For example, IC packaging has evolved, such that multiple ICs may be vertically stacked in so-called three-dimensional ("3D") packages, or 2.5D packages (which use an interposer). Integration of these advanced IC packaging technologies with IC design are needed.

BRIEF DESCRIPTION OF THE DRAWINGS

The present disclosure is best understood from the following detailed description when read with the accompanying figures. It is emphasized that, in accordance with the standard practice in the industry, various features are not drawn to scale and are used for illustration purposes only. In fact, the dimensions of the various features may be arbitrarily increased or reduced for clarity of discussion.

DETAILED DESCRIPTION

Figure 1:
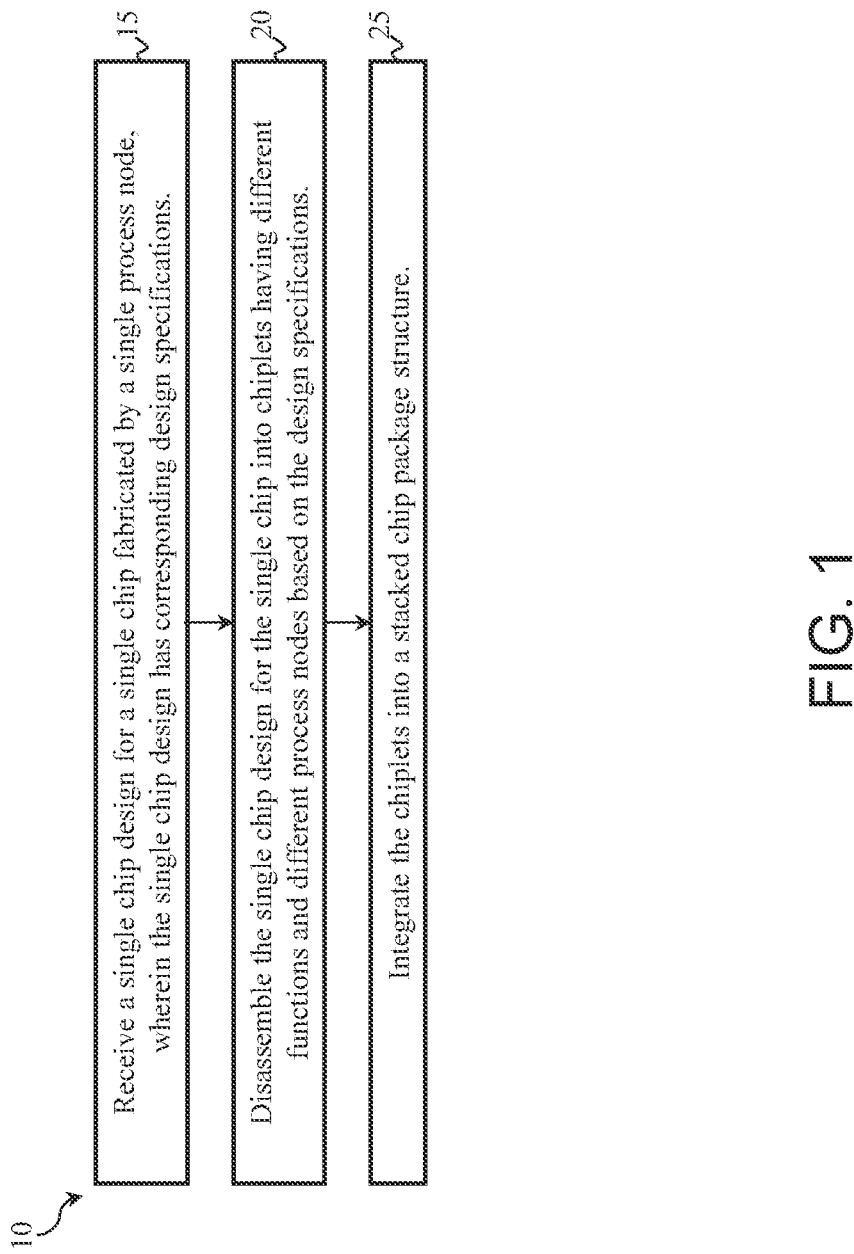
FIG. 1 is a flow chart of a method for generating a multichip, hybrid node stacked package design from a single chip design using artificial intelligence (AI) techniques, in portion or entirety, according to various aspects of the present disclosure.

The present disclosure is generally directed to three-dimensional (3D) packaging technologies, and more particularly, to for generating multichip, hybrid node stacked packages from single chip designs using artificial intelligence.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "lower," "upper," "horizontal," "vertical," "above," "over," "below," "beneath," "up," "down," "top," "bottom," etc. as well as derivatives thereof (e.g., "horizontally," "downwardly," "upwardly," etc.) are used for ease of the present disclosure of one features relationship to another feature. The spatially relative terms are intended to cover different orientations of the device including the features.

Figure 2:
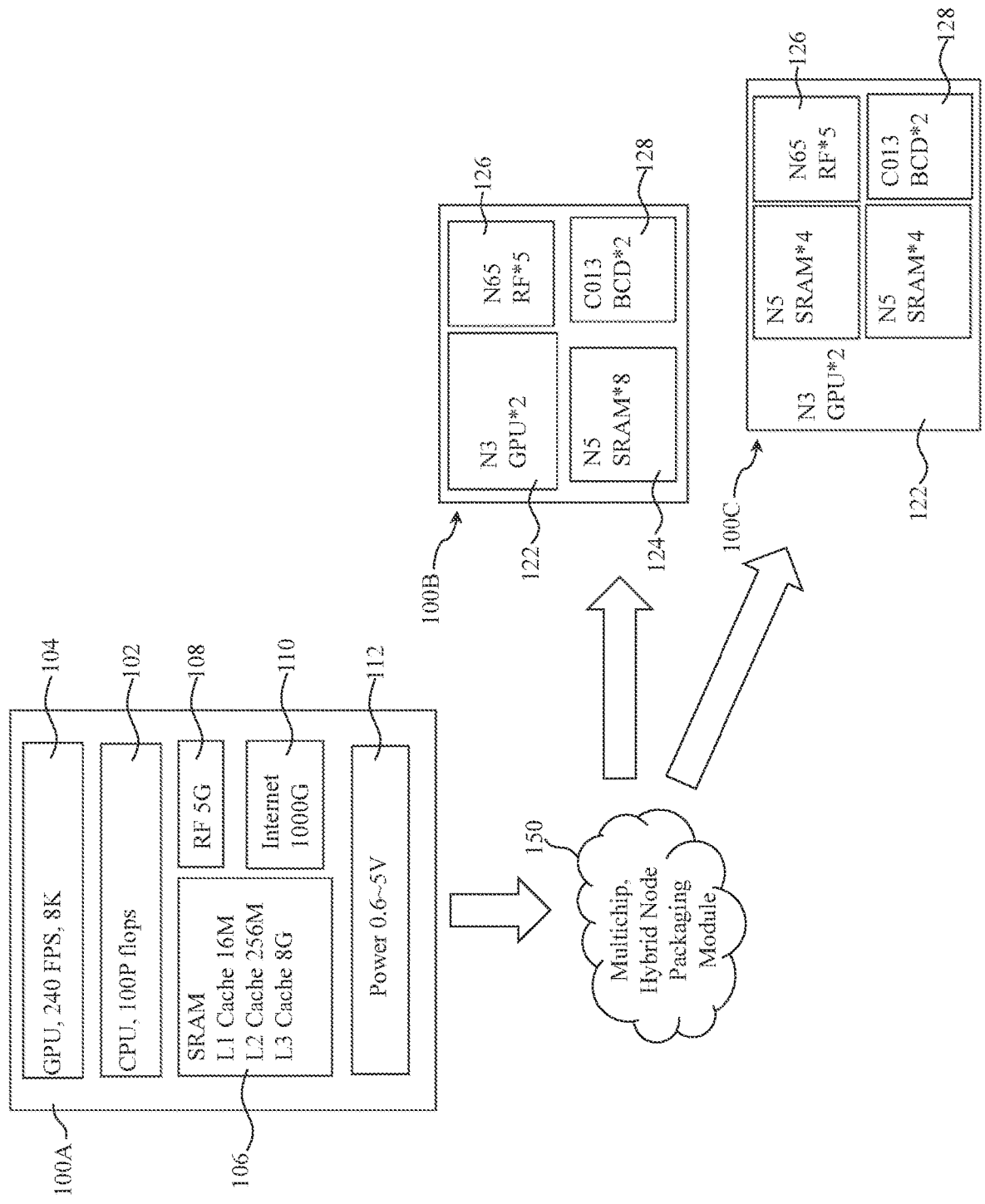
FIG. 2 illustrates generating a multichip, hybrid node stacked package design from a single chip design using method of FIG. 1, in portion or entirety, according to various aspects of the present disclosure.

FIG. 1 is a flow chart of a method for generating a multichip, hybrid node stacked package design from a single chip design using artificial intelligence (AI) techniques, such as machine learning (e.g., artificial neural networks), in portion or entirety, according to various aspects of the present disclosure. FIG. 2 illustrates generating a multichip, hybrid node stacked package design from a single chip design using method 10 of FIG. 1, in portion or entirety, according to various aspects of the present disclosure. Method 10 can facilitate heterogenous integration using advanced packaging technologies, enlarge design for manufacturability (DFM) of single chip designs, and/or reduce cost to manufacture and/or size of systems provided by single chip designs. Different embodiments may have different advantages, and no particular advantage is required of any embodiment. FIG. 1 and FIG. 2 have been simplified for the sake of clarity to better understand the inventive concepts of the present disclosure. Additional features can be added in FIG. 1 and FIG. 2, and some of the features described below can be replaced, modified, or eliminated in other embodiments of FIG. 1 and FIG. 2.

Method 10 begins at block 15 with receiving a single chip design for a single chip (or die) of a single technology process node. The single chip includes at least one functional integrated circuit (IC), such as an IC configured to perform a logic function, a memory function, a digital function, an analog function, a mixed signal function, a radio frequency (RF) function, an input/output (I/O) function, a communications function, a power management function, and/or other function. In some embodiments, a semiconductor foundry receives the single IC chip design for the single chip from a customer. In some embodiments, the single chip design is for a system-on-chip (SoC), which generally refers to a single chip or monolithic die having multiple functions. In some embodiments, the SoC is a single chip having an entire system, such as a computer system, fabricated thereon. In some embodiments, the single chip design is for a single chip 100A (also be referred to as a monolithic die), such as depicted in FIG. 2, that includes circuitry and/or circuits for a system having a central processing unit (CPU) 102, a graphics processing unit (GPU) 104, a memory unit 106, a communications unit 108, a communications unit 110, and a power management unit 112. For example, single chip 100A is an SoC.

Each unit of the system may operate according to design specifications that includes, for example, physical metrics (e.g., component types, size, etc.), performance metrics, and/or operation metrics, for single chip 100A. The design specifications also include power, performance, area, and cost (PPAC) specifications for single chip 100A. In the depicted embodiment, the design specifications indicate that CPU 102 can process 100 peta floating point operations per second (PFLOPS); GPU 104 can output 240 frames/second (FPS) and provide 8K resolution (i.e., an image resolution and/or a display resolution having a width of about 8,000 pixels); memory unit 106 can provide static random access memory (SRAM) having first-level (L1) cache, second-level (L2) cache, and third-level (L3) cache of different sizes, such as 16 megabytes (M), 256 M, and 8 gigabytes (G), respectively; communications unit 108 can support wired communications and/or wireless communications by implementing, for example, 5G (i.e., $5^{th}$ generation) wireless communications protocols; communications unit 110 can support wired communications and/or wireless communications by implementing, for example, Gigabit Ethernet protocols (i.e., data transfer rates of one gigabit per second (1,000 megabits per second (Mbps)), such as data transfer rates of 10/100/1000 Mbps); and/or power management unit 112 can support powering voltages of about 0.6 volts (V) to about 5V.

Circuitry of single chip 100A can include various passive microelectronic devices and active microelectronic devices, such as resistors, capacitors, inductors, diodes, p-type field effect transistors (PFETs), n-type FETs (NFETs), metal-oxide semiconductor (MOS) FETs (MOSFETs), complementary MOS (CMOS) transistors, bipolar junction transistors (BJTs), laterally diffused MOS (LDMOS) transistors, high voltage transistors, high frequency transistors, other suitable devices, or combinations thereof. The various microelectronic devices are configured and arranged to provide functionally distinct regions of single chip 100A, such as CPU 102, GPU 104, memory unit 106, communications unit 108, communications unit 110, and/or power management unit 112. In some embodiments, one or more of the transistors are configured as planar transistors, where a channel of a planar transistor is formed in a semiconductor substrate between respective source/drains and a respective metal gate is disposed on the channel (e.g., on a portion of the semiconductor substrate in which the channel is formed). In some embodiments, one or more of the transistors are configured as non-planar transistors, where a channel of a non-planar transistor is formed in a semiconductor fin that extends from a semiconductor substrate and between respective source/drains on/in the semiconductor fin, where a respective metal gate is disposed on and wraps the channel of the semiconductor fin (i.e., the non-planar transistor is a fin-like FET (FinFET)). In some embodiments, one or more of the transistors are configured as non-planar transistors having channels formed in semiconductor layers suspended over a semiconductor substrate and extending between respective source/drains, where a respective metal gate is disposed on and surrounds the channels (i.e., the non-planar transistors are gate-all-around (GAA) transistors). In some embodiments, various device components and/or device features can include a semiconductor substrate, doped wells (e.g., n-wells and/or p-wells), isolation features (e.g., shallow trench isolation (STI) structures and/or other suitable isolation structures), metal gates (for example, a metal gate having a gate electrode over a gate dielectric), gate spacers along sidewalls of the metal gates, source/drain features (e.g., epitaxial source/drain features, lightly doped source/drain regions, heavily doped source/drain regions, etc.), and/or a multilayer interconnect (MLI) feature.

As noted, the single chip, such as single chip 100A, is fabricated by a single technology process node. Generally, a process node (or technology node) refers to a collection of manufacturing processes implemented to fabricate ICs according to a given set of design rules (i.e., predetermined features sizes and/or feature sizes within predetermined tolerances). In some embodiments, a process node refers to a collection of manufacturing processes that can fabricate ICs of a minimum metal pitch, a minimum metal half pitch, a minimum gate length, and/or other minimum physical dimension. Chip density generally increases as process node decreases. For example, a number of transistors per area of a chip fabricated at 5 nm process node (e.g., a 5 nm (N5) chip) is greater than a number of transistors per area of a chip fabricated at 22 nm process node (e.g., a 22 nm (N22) chip) and thus an N5 chip may provide greater computing power while consuming less energy than an N22 chip. In the present example, single chip 100A is an N3 chip. For example, the various components and/or circuitry of CPU 102, GPU 104, memory unit 106, communications unit 108, communications unit 110, and power management unit 112 are fabricated on a wafer using N3 semiconductor fabrication processes.

Method 10 proceeds at block 20 with disassembling the single chip design for the single chip, such as single chip 100A, into chiplets having different functions and different process nodes based on the design specifications, including the PPAC specifications. For example, single chip 100A is disassembled into a chipset (i.e., a set of chiplets) that includes two N3 GPU chiplets 122, eight N5 static random-access memory (SRAM) chiplets 124, five N65 RF chiplets 126, and two C013 BCD chiplets 128 (i.e., 0.13-micron (μm) node (C013) bipolar, CMOS, and DMOS (BCD) technology chips). The chipset provides a system that can process 100 PFLOPS, output 240 FPS, provide 8K resolution, provide 16 M L1 cache, provide 256 M L2 cache, provide 8 G L3 cache, support 5G and 1000G communication protocols, and support powering a voltage range of about 0.6 V to about 5 V as provided by the design specifications for single chip 100A. The chipset also meets the PPAC specifications for single chip 100A, such as a power requirement, a performance requirement, a size requirement, a cost requirement, a bandwidth requirement, and/or other metric requirement. The chipset thus has chiplets having different functions (i.e., GPU, RF, SRAM, BCD, etc.) and different process nodes (e.g., N3, N5, N65, C013, etc.), where the functions and the process nodes of the chipset are selected based on the design specifications, including the PPAC specifications. Accordingly, a system provided by the chipset is substantially the same as a system provided by single chip 100A. The chipset can thus replace single chip 100A. In some embodiments, the chipset seamlessly integrates into applications for single chip 100A (i.e., the chipset and single chip 100A can be used in the same applications with similar results). In some embodiments, a performance of a system of the chipset (e.g., processing speed, storage capacity, imaging resolution, etc.) is substantially the same as a performance of single chip 100A. In some embodiments, a performance of the system of the chipset (e.g., processing speed, storage capacity, imaging resolution, etc.) may be better than a performance of the system of single chip 100A. In some embodiments, a cost and/or a size of the chipset is less than a cost and/or a size of single chip 100A.

Method 10 proceeds at block 25 with integrating the chiplets into a stacked chip package structure, thereby by generating a multichip, hybrid node package design for single chip 100A. For example, the chiplets are arranged into at least one chiplet stack and packaged according to a suitable multichip packaging technology, such as into a chip-on-wafer-on-substrate (CoWoS) package, an integrated-fan-out (InFO) package, a system on integrated chip (SoIC) package, other three-dimensional integrated circuit (3DIC) package, or a hybrid package that implements a combination of multichip packaging technologies. In some embodiments, the chiplets are organized into a multichip, hybrid node package 100B, such as a CoWoS package or an InFO package. For example, the chiplets are arranged into four chiplet stacks (i.e., a stack of GPU chiplets 122, a stack of SRAM chiplets 124, a stack of RF chiplets 126, and a stack of BCD chiplets 128), which are attached to an interposer when multichip, hybrid node package 100B is a CoWoS package or a redistribution layer (RDL) when multichip, hybrid node package 100B is an InFO package, where the interposer and/or the RDL may further be attached to a package substrate. In some embodiments, the chiplets are organized into a multichip, hybrid node package 100C, such as an SoIC package. For example, the chiplets are arranged into a stack of GPU chiplets 122, where the stack of GPU chiplets 122 may be attached to a package substrate, and four chiplet stacks (i.e., a stack of four SRAM chiplets 124, a stack of four SRAM chiplets 124, a stack of RF chiplets 126, and a stack of BCD chiplets 128) are attached to the stack of GPU chiplets 122. In multichip, hybrid node package 100C, a size of GPU chiplets 122 is greater than a size of SRAM chiplets 124, RF chiplets 126, and BCD chiplets 128.

In some embodiments, a multichip, hybrid node packaging module 150 performs the disassembling at block 20 and the integrating at block 25. In some embodiments, multichip, hybrid node packaging module 150 disassembles a single chip design of a single chip of a single process node into chiplet functions, selects chiplets based on the chiplet functions and design specifications, selects a stacking arrangement for the chiplets based on the design specifications, and adjusts the chiplets, process nodes of the chiplets, and/or stacking arrangement of the chiplets to satisfy the design specifications for the single chip, including PPAC specifications. In some embodiments, multichip, hybrid node packaging module 150 adjusts the chiplets, process nodes of the chiplets, and/or stacking arrangement of the chiplets to optimize PPAC. In some embodiments, multichip, hybrid node packaging module 150 adjusts the chiplets, process nodes of the chiplets, and/or stacking arrangement of the chiplets to optimize a performance metric of the chipset. Adjusting the chiplets, process nodes of the chiplets, and/or stacking arrangement can include switching out chiplets (e.g., switching an N3 GPU chiplet for an N5 GPU chiplet, switching a first combination of chiplets for a second combination of chiplets, etc.), rearranging chiplets (e.g., reorganizing chiplet stacks), switching a type of stacked chip package structure, and/or other suitable action that can modify the chipset to meet the design specifications.

Multichip, hybrid node packaging module 150 may evaluate a first chipset in a selected stacking arrangement and a second chipset in the selected stacking arrangement and determine whether the first chipset and the second chipset meet the design specifications, including the PPAC specifications. In some embodiments, the first chipset, but not the second chipset, provides a system that meets the design specifications, such that a multichip, hybrid node package is constructed with the first chipset in the selected stacking arrangement. In some embodiments, both the first chipset and the second chipset provide systems that meet the design specifications. In such embodiments, multichip, hybrid node packaging module 150 may determine that a cost and/or a size of a system provided by the first chipset is less than a cost and/or a size of s system provided by the second chipset, such that a multichip, hybrid node package is constructed with the chipset in the selected stacking arrangement. In such embodiments, multichip, hybrid node packaging module 150 may determine that a performance metric and/or a power metric of the system provided by the second chipset is better than a performance metric and/or a power metric of the system provided by the second chipset, such that a multichip, hybrid node package is constructed with the second chipset.

Multichip, hybrid node packaging module 150 may evaluate a selected chipset in a first stacking arrangement and a second stacking arrangement and determine whether the first stacking arrangement and the second stacking arrangement meet the design specifications, including the PPAC specifications. In some embodiments, the first stacking arrangement, but not the second stacking arrangement, provides a system that meets the design specifications, such that a multichip, hybrid node package is constructed with the chipset in the first stacking arrangement. In some embodiments, both the first stacking arrangement and the second stacking arrangement provide systems that meet the design specifications. In such embodiments, multichip, hybrid node packaging module 150 may determine that a cost and/or a size of a system having the first stacking arrangement is less than a cost and/or a size of a system having the second stacking arrangement, such that a multichip, hybrid node package is constructed with the chipset in the first stacking arrangement. In such embodiments, multichip, hybrid node packaging module 150 may determine that a performance metric and/or a power metric of the system having the second stacking arrangement is better than a performance metric and/or a power metric of the system having the first stacking arrangement, such that a multichip, hybrid node package is constructed with the chipset in the second stacking arrangement.

In some embodiments, multichip, hybrid node packaging module 150 uses high performance computing (HPC) techniques to disassemble and integrate. In some embodiments, multichip, hybrid node packaging module 150 uses simulating to disassemble and integrate. For example, multichip, hybrid node packaging module 150 simulates systems provided by different combinations of chipsets and/or stacking arrangements, evaluates the systems, and selects a chipset and corresponding stacking arrangement that meets the design specifications, including PPAC specifications. A multichip, hybrid node package can then be constructed that includes the selected chipset and the corresponding stacking arrangement. In some embodiments, multichip, hybrid node packaging module 150 uses data and/or databases to disassemble and integrate. For example, multichip, hybrid node packaging module 150 searches a database that correlates system metrics of a system with different combinations of chipsets and/or stacking arrangements and selects a chipset and corresponding stacking arrangement from the database that corresponds with a system having system metrics that meet the design specifications, including PPAC specifications. A multichip, hybrid node package can then be constructed that includes the selected chipset and the corresponding stacking arrangement. In some embodiments, multichip, hybrid node packaging module 150 uses mines data, including big data, to generate a multichip, hybrid node package design from single chip 100A.

In some embodiments, multichip, hybrid node packaging module 150 uses machine learning to disassemble and integrate. For example, multichip, hybrid node packaging module 150 can manipulate one or more chiplet parameters (e.g., adjust chiplet type, adjust chiplet number, adjust chiplet size, adjust chiplet process node, adjust chiplet metrics, etc.) and/or packaging parameters (e.g., adjust chiplet stacking arrangement, adjust package type, adjust chiplet stack number, etc.) over multiple iterations to develop multichip, hybrid node packaging models using a machine learning process until the multichip, hybrid node packaging models satisfy design specifications, including PPAC specifications, for single chips. In some embodiments, each multichip, hybrid node packaging model satisfies design specifications for a respective single chip. In some embodiments, a multichip, hybrid node packaging model satisfies design specifications for multiple single chip designs. Machine learning may generally refer to using algorithms to parse data, learn from the data, and make a determination or prediction based on the data, such as whether a given chipset having a given stacking arrangements meets design specifications of a given single chip. Machine learning uses algorithms that can learn from data without relying on rules-based programming. A machine learning algorithm may include a parametric model, a nonparametric model, a deep learning model, a neural network, a linear discriminant analysis model, a quadratic discriminant analysis model, a support vector machine, a random forest algorithm, a nearest neighbor algorithm, a combined discriminant analysis model, a k-means clustering algorithm, a supervised model, an unsupervised model, logistic regression model, a multivariable regression model, a penalized multivariable regression model, and/or another type of model.

Figure 3A:
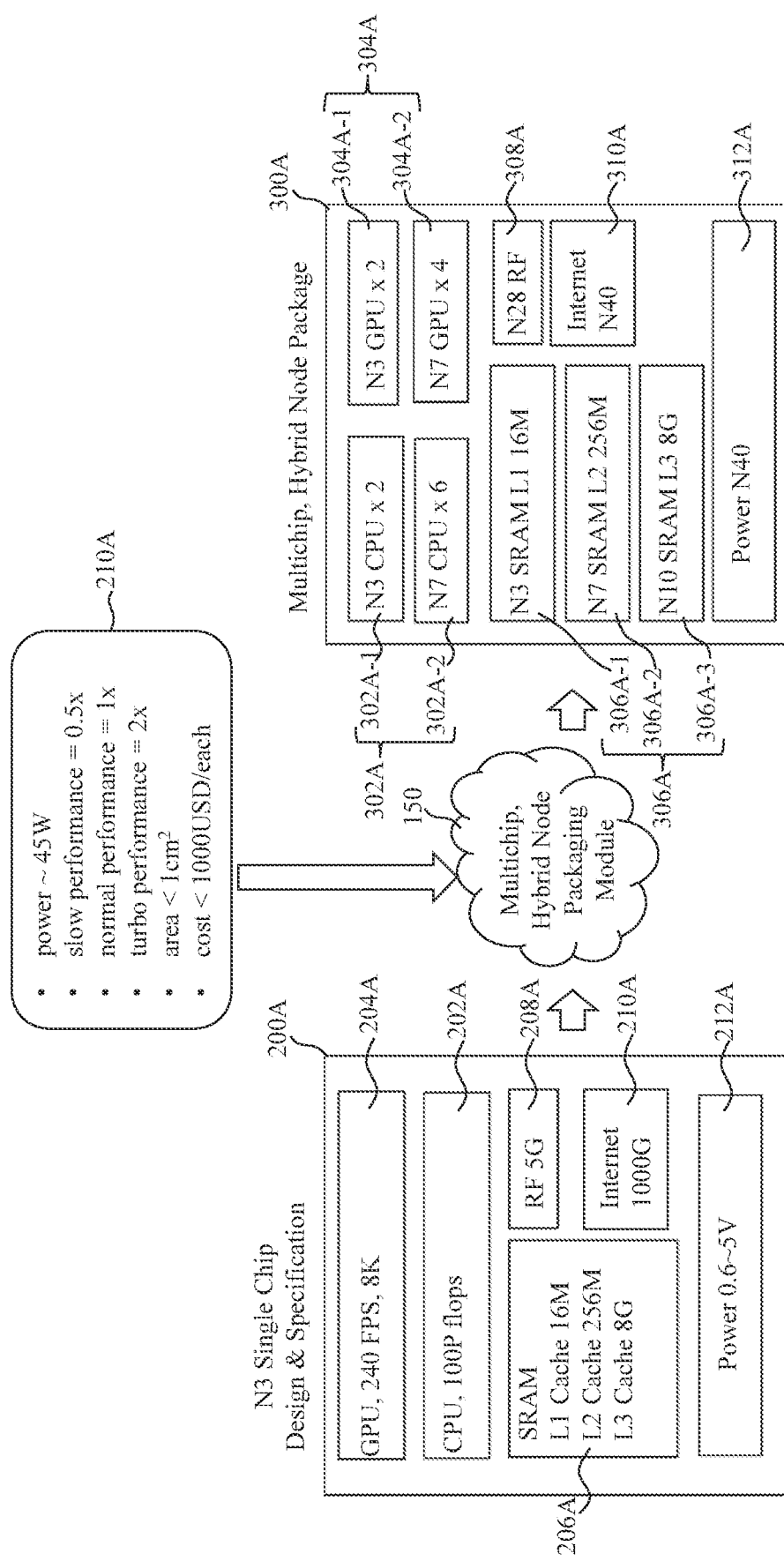
FIGS. 3A-3C illustrate generating various multichip, hybrid node stacked package designs from various single chip designs using method of FIG. 1, in portion or entirety, according to various aspects of the present disclosure.
Figure 3B:
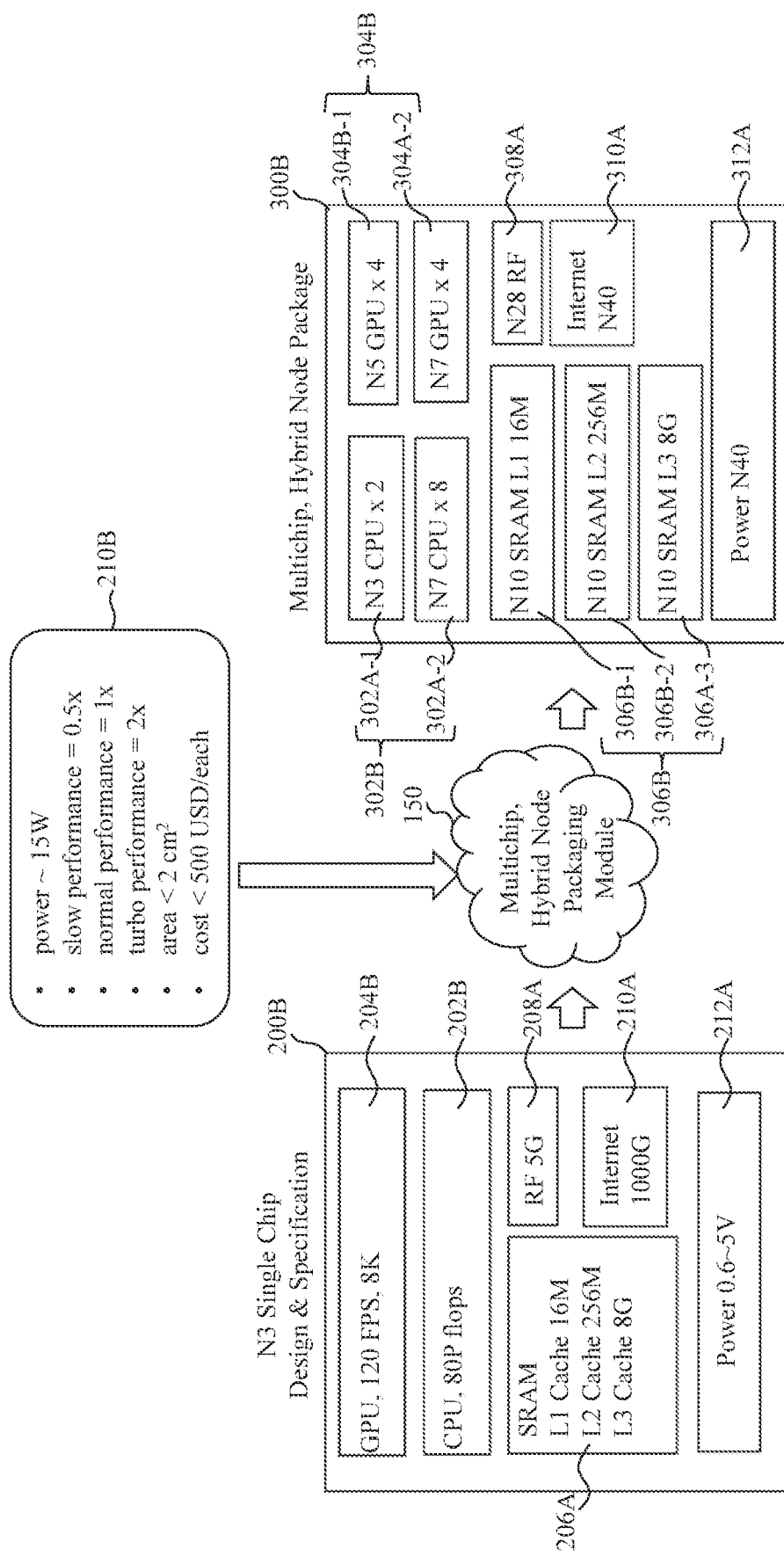
Figure 3C:
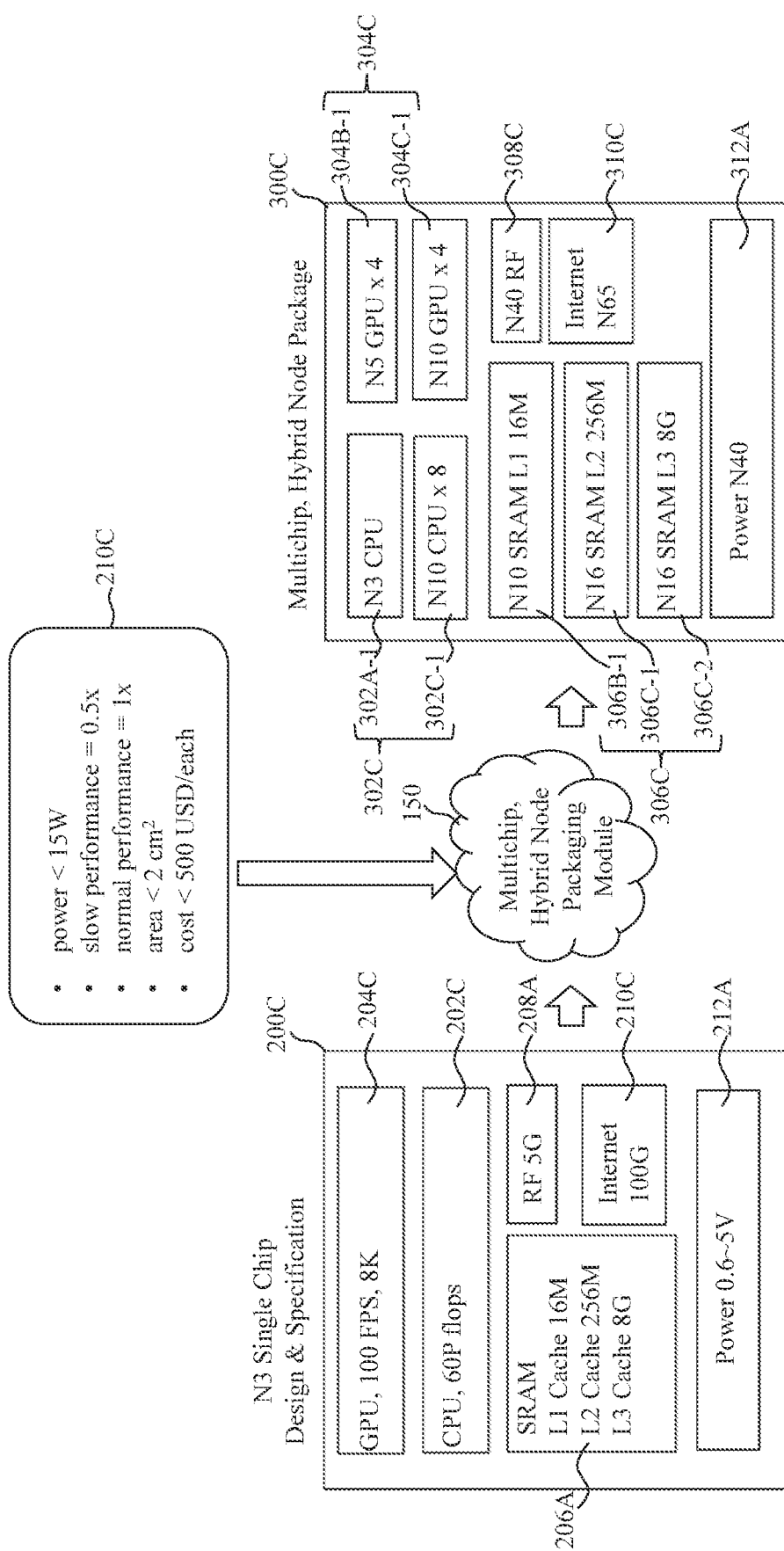

FIGS. 3A-3C illustrate various multichip, hybrid node package designs that can be generated by disassembling a single chip design for a single chip of a single process node into a chipset and integrating the chipset into a stacked chip package structure according to various aspects of the present disclosure. FIGS. 3A-3C have been simplified for the sake of clarity to better understand the inventive concepts of the present disclosure. Additional features can be added in multichip, hybrid node packages, and some of the features described below can be replaced, modified, or eliminated in other embodiments of multichip, hybrid node packages.

Turning to FIG. 3A, multichip, hybrid node packaging module 150 receives a single chip design for a single chip 200A of a single process node, such as N3 process node (though the present disclosure contemplates embodiments where single chip 200A is for a different process node). Single chip 200A is an SoC that includes a CPU 202A, a GPU 204A, a memory unit 206A (e.g., an SRAM), a communications unit 208A (e.g., an RF unit or module), a communications unit 210A (e.g., an Internet unit or module), and a power management unit 212A. Multichip, hybrid node packaging module 150 further receives design specifications that correspond with single chip 200A, including PPAC specifications 210A. According to the single chip design specifications, CPU 202A is configured to process 100 PFLOPS; GPU 204A is configured to output 240 FPS and provide 8K resolution; memory unit 206A is configured to provide SRAM having L1 cache, L2 cache, and L3 cache of 16 M, 256 M, and 8 G, respectively; communications unit 208A is configured to support 5G; communications unit 210G is configured to support 1000G; and/or power management unit 112 is configured to support voltages of about 0.6 V to about 5V. Further, in some embodiments, PPAC specifications 210A indicate that single chip 200A will be fabricated to have a power rating of about 45 W, three operating modes (e.g., normal, slow, and turbo), a size that is less than about 1 cm$^2$ (i.e., a length by a width that is about 1 cm by 1 cm), and a cost less than about $1,000.

Multichip, hybrid node packaging module 150 disassembles single chip 200A into chiplets having different functions and different process nodes based on the design specifications, including PPAC specifications 210A, and integrates the chiplets into a stacked chip package structure, thereby providing a multichip, hybrid node package 300A (i.e., a chipset having the design specifications, including PPAC specifications 210A). For example, single chip 200A is disassembled into various chiplets, such as CPU chiplets 302A (e.g., two N3 CPU chiplets 302A-1 and six N7 CPU chiplets 302A-2, which may be collectively configured to provide 100 PFLOPS), GPU chiplets 304A (e.g., two N3 GPU chiplets 304A-1 and four N7 GPU chiplets 304A-2, which may be collectively configured to output 240 FPS and provide 8K resolution), memory chiplets 306A (e.g., one N3 SRAM chiplet 306A-1 for providing L1 cache of 16 M, one N7 SRAM chiplet 306A-2 for providing L2 cache of 256 M, and one N10 SRAM chiplet 306A-3 for providing L3 cache of 8G), a communications chiplet 308A (e.g., one N28, RF chiplet that supports 5G), a communications chiplet 310A (e.g., one 40 nm Internet chiplet that supports 1000G), and a power management chiplet 312A (e.g., one N40 power chiplet that supports voltages of about 0.6 V to about 5V).

Multichip, hybrid node packaging module 150 arranges CPU chiplets 302A, GPU chiplets 304A, memory chiplets 306A, communications chiplet 308A, communications chiplet 310A, and power management chiplet 312A (collectively referred to as a chipset) into at least one chiplet stack based on any suitable multichip packaging technology to provide multichip, hybrid node package 300A. For example, multichip, hybrid node package 300A is an CoWoS package, an InFo package, an SoIC package, other 3DIC package, and/or a 3DIC package that implements a combination of multichip packaging technologies, such as those described herein. The various chiplets can be stacked in any suitable manner (i.e., stacked by same function, stacked by different functions, etc.). In some embodiments, multichip, hybrid node package 300A has a cost and/or a size that is less than a cost and/or a size of single chip 200A (i.e., a cost less than $1,000 and/or a size less than 1 cm$^2$) while providing three operating modes, the same or better power rating than single chip 200A, and/or providing the same functions as the single chip 200A.

Turning to FIG. 3B, multichip, hybrid node packaging module 150 receives a single chip design for a single chip 200B of a single process node, such as N3 process node.

Single chip 200B is similar to single chip 200A, except CPU and GPU requirements of single chip 200B are different than CPU and GPU requirements of single chip 200A. For example, single chip 200B is an SoC that includes a CPU 202B, a GPU 204B, memory unit 206A, communications unit 208A, communications unit 210A, and power management unit 212A. According to the single chip design specifications, CPU 202B is configured to process 80 PFLOPS, instead of 100 PFLOPS, and GPU 204B is configured to output 120 FPS, instead of 240 FPS. Further, in some embodiments, PPAC specifications 210B are different than PPAC specifications 210A. For example, PPAC specifications 210B indicate that single chip 200B will be fabricated to have a power rating of about 15 W, three operating modes (e.g., normal, slow, and turbo), a size that is less than about 2 cm$^2$, and a cost less than about $500.

Multichip, hybrid node packaging module 150 disassembles single chip 200B into chiplets having different functions and different process nodes based on the design specifications, including PPAC specifications 210B. For example, single chip 200B is disassembled into CPU chiplets 302B (e.g., two N3 CPU chiplets 302A-1 and eight N7 CPU chiplets 302A-2, which may be collectively configured to provide 80 PFLOPS), GPU chiplets 304B (e.g., four N5 GPU chiplets 304B-1 and four N7 GPU chiplets 304A-2, which may be collectively configured to provide 120 FPS and 8K resolution), memory chiplets 306B (e.g., one N10 SRAM chiplet 306B-1 to provide L1 cache of 16 M, one N10 SRAM chiplet 306B-2 to provide L2 cache of 256 M, and one N10 SRAM chiplet 306A-3 to provide L3 cache of 8G), communications chiplet 308A (e.g., one N28 RF chiplet that supports 5G), communications chiplet 310A (e.g., one N40 Internet chiplet that supports 1000G), and power management chiplet 312A (e.g., one N40 power chiplet that supports voltages of about 0.6 V to about 5V).

Multichip, hybrid node packaging module 150 further integrates the chiplets into a stacked chip package structure, thereby providing a multichip, hybrid node package 300B (i.e., a chipset that provides a system having the design specifications, including PPAC specifications 210B, corresponding with single chip 200B). For example, multichip, hybrid node packaging module 150 arranges CPU chiplets 302B, GPU chiplets 304B, memory chiplets 306B, communications chiplet 308A, communications chiplet 310A, and power management chiplet 312A (collectively referred to as a chipset) into at least one chiplet stack based on any suitable multichip packaging technology to provide multichip, hybrid node package 300B. For example, multichip, hybrid node package 300B is an CoWoS package, an InFo package, an SoIC package, other 3DIC package, and/or a 3DIC package that implements a combination of multichip packaging technologies, such as those described herein. The various chiplets can be stacked in any suitable manner (i.e., stacked by same function, stacked by different functions, etc.). In some embodiments, multichip, hybrid node package 300B has a cost and/or a size that is less than a cost and/or a size of single chip 200B (i.e., a cost less than $500 and/or a size less than 2 cm$^2$) while providing three operating modes, the same or better power rating than single chip 200B, and/or providing the same functions as the single chip 200B.

Turning to FIG. 3C, multichip, hybrid node packaging module 150 receives a single chip design for a single chip 200C of a single process node, such as N3 process node. Single chip 200C is similar to single chip 200A, except CPU, GPU, and communications requirements of single chip 200C are different than CPU, GPU, and communications requirements of single chip 200A. For example, single chip 200C is an SoC that includes a CPU 202C, a GPU 204C, memory unit 206A, communications unit 208A, a communications unit 210C, and power management unit 212A. According to the single chip design specifications, CPU 202C is configured to process 60 PFLOPS, instead of 100 PFLOPS, and GPU 204B is configured to output 100 FPS, instead of 240 FPS, and communications unit 210C is configured to support 100G, instead of 1000G. Further, in some embodiments, PPAC specifications 210C are different than PPAC specifications 210A. For example, PPAC specifications 210C indicate that single chip 200C will be fabricated to have a power rating less than about 15 W, two operating modes (e.g., normal and slow), a size that is less than about 2 cm$^2$, and a cost less than about $500.

Multichip, hybrid node packaging module 150 disassembles single chip 200C into chiplets having different functions and different process nodes based on the design specifications, including PPAC specifications 210C. For example, single chip 200C is disassembled into CPU chiplets 302C (e.g., one N3 CPU chiplet 302A-1 and eight N10 CPU chiplets 302C-1, which may be collectively configured to provide 60 PFLOPS), GPU chiplets 304C (e.g., four N5 GPU chiplets 304B-1 and four N10 GPU chiplets 304C-1, which may be collectively configured to provide 100 FPS and 8K resolution), memory chiplets 306B (e.g., one N10 SRAM chiplet 306B-1 to provide L1 cache of 16 M, one N16 SRAM chiplet 306C-1 to provide L2 cache of 256 M, and one N16 SRAM chiplet 306B-2 to provide L3 cache of 8G), a communications chiplet 308C (e.g., one N40 RF chiplet that supports 5G), a communications chiplet 310C (e.g., one N65 Internet chiplet that supports 100G), and power management chiplet 312A (e.g., one N40 power chiplet that supports voltages of about 0.6 V to about 5V).

Multichip, hybrid node packaging module 150 further integrates the chiplets into a stacked chip package structure, thereby providing a multichip, hybrid node package 300B (i.e., a chipset that provides a system having the design specifications, including PPAC specifications 210C, corresponding with single chip 200C). For example, multichip, hybrid node packaging module 150 arranges CPU chiplets 302C, GPU chiplets 304C, memory chiplets 306C, communications chiplet 308C, communications chiplet 310C, and power management chiplet 312A (collectively referred to as a chipset) into at least one chiplet stack based on any suitable multichip packaging technology to provide multichip, hybrid node package 300C. For example, multichip, hybrid node package 300C is an CoWoS package, an InFo package, an SoIC package, other 3DIC package, and/or a 3DIC package that implements a combination of multichip packaging technologies, such as those described herein. The various chiplets can be stacked in any suitable manner (i.e., stacked by same function, stacked by different functions, etc.). In some embodiments, multichip, hybrid node package 300C has a cost and/or a size that is less than a cost and/or a size of single chip 200C (i.e., a cost less than $500 and/or a size less than 2 cm$^2$) while providing two operating modes, the same or better power rating than single chip 200C, and/or providing the same functions as the single chip 200C.

Figure 4:
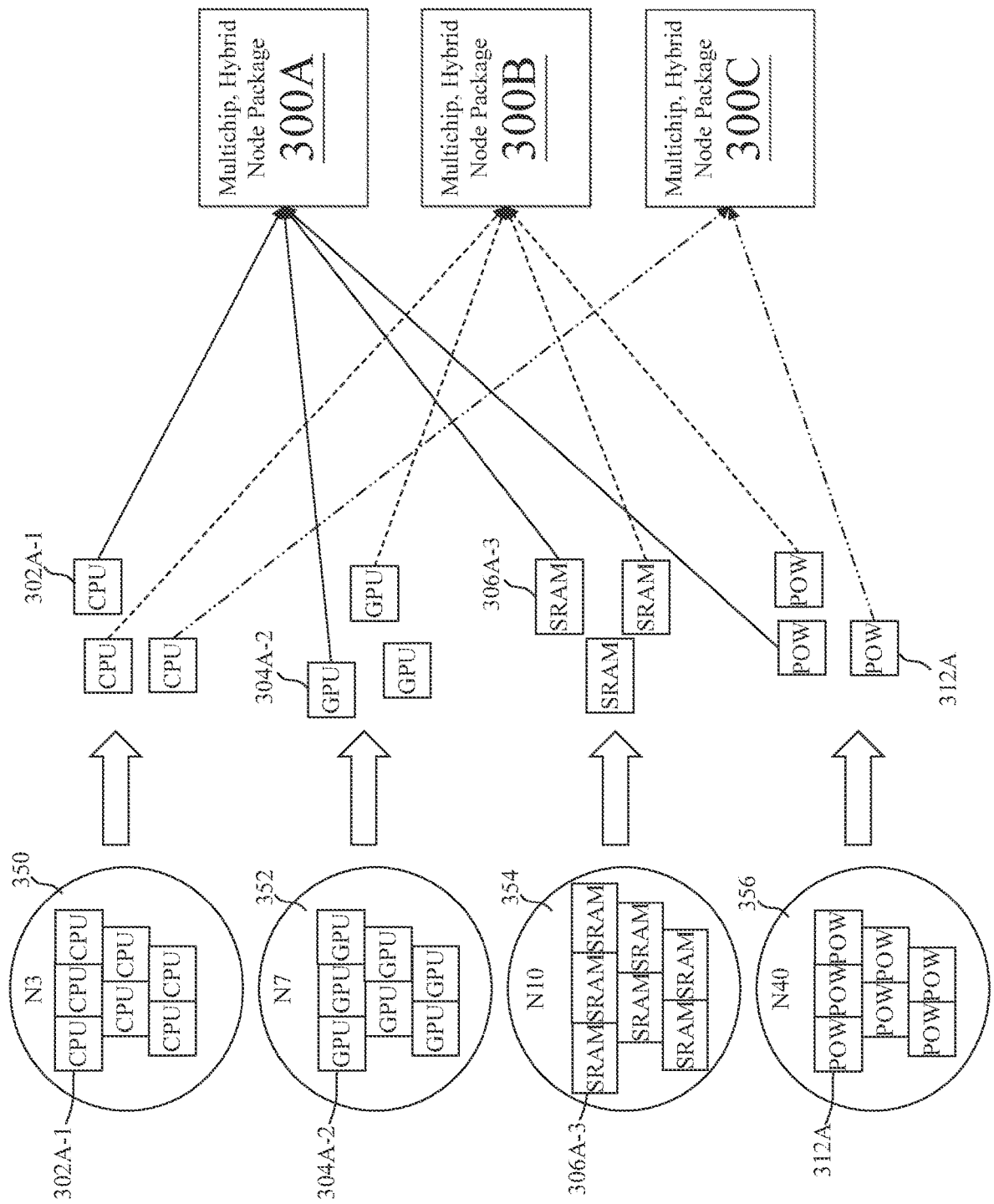
FIG. 4 illustrates assembling, in portion or entirety, multichip, hybrid node packages based on multichip, hybrid node stacked package designs generated from single chip designs by the method of FIG. 1 according to various aspects of the present disclosure.

It is noted that multichip, hybrid node packages 300A-300C use some of the same chiplets but still provide different systems with different specifications (e.g., different PFLOPS, different FPS, different data transfer rates (e.g., 100G vs 1000G), and/or different PPAC metrics). For example, multichip, hybrid node packages 300A-300C each have at least one N3 CPU chiplet 302A-1 and at least one N40 power management chiplet 312A. In another example, multichip, hybrid node package 300A and multichip, hybrid node package 300B each have at least one N7 GPU chiplet 304A-2 and at least one N10 SRAM chiplet 306A-3. Accordingly, instead of individually fabricating single chips 200A-200C, the present methodology provides for processing wafers to form chiplets having different functions and different process nodes and integrating those chiplets into unique combinations and/or packaging arrangements to provide different systems. For example, in FIG. 4, a wafer 350 is fabricated using N3 processes to provide N3 CPU chiplets 302A-1, a wafer 352 is fabricated using N7 processes to provide N7 GPU chiplets 304A-2, a wafer 354 is fabricated using N10 processes to provide N10 SRAM chiplets 306A-3, and a wafer 356 is fabricated using N40 processes to provide N40 power management chiplets 312. After dicing and sorting, the various chiplets can then be integrated into multichip, hybrid node packages 300A-300C to provide systems of single chips 200A-200C, respectively, without having to fabricate the systems using a single, more advanced process node, such as the N3 process node. The proposed methodology can thus significantly reduce manufacturing costs and/or time associated with a system by providing the system in a multichip, hybrid node package, such as described herein, instead of a single chip.

In some embodiments, single chip 200A, single chip 200B, and/or single chip 200C are fabricated using planar transistor technology, and thus, circuitry and/or circuits of the various units of their respective SoCs are formed from planar transistors. In some embodiments, single chip 200A, single chip 200B, and/or single chip 200C are fabricated using non-planar transistor technology, and thus, circuitry and/or circuits of the various units of their respective SoCs are formed from non-planar transistors, such as FinFETs and/or GAA transistors. In some embodiments, single chip 200A, single chip 200B, and/or single chip 200C are fabricated using hybrid transistor technology, and thus, circuitry and/or circuits of the various units of their respective SoCs are formed from planar transistors and/or non-planar transistors depending on design requirements. In some embodiments, single chip 200A, single chip 200B, and/or single chip 200C are fabricated using planar transistor technology and their corresponding multichip, hybrid node package 300A, multichip, hybrid node package 300B, and/or multichip, hybrid node package 300C are fabricated using non-planar transistor technology. In some embodiments, single chip 200A, single chip 200B, and/or single chip 200C are fabricated using non-planar transistor technology and their corresponding multichip, hybrid node package 300A, multichip, hybrid node package 300B, and/or multichip, hybrid node package 300C are fabricated using planar transistor technology. In some embodiments, single chip 200A, single chip 200B, and/or single chip 200C are fabricated using planar transistor technology and their corresponding multichip, hybrid node package 300A, multichip, hybrid node package 300B, and/or multichip, hybrid node package 300C are fabricated using a combination of planar transistor technology and non-planar transistor technology. In some embodiments, single chip 200A, single chip 200B, and/or single chip 200C are fabricated using planar transistor technology and their corresponding multichip, hybrid node package 300A, multichip, hybrid node package 300B, and/ or multichip, hybrid node package 300C are fabricated using planar transistor technology. In some embodiments, single chip 200A, single chip 200B, and/or single chip 200C are fabricated using non-planar transistor technology and their corresponding multichip, hybrid node package 300A, multichip, hybrid node package 300B, and/or multichip, hybrid node package 300C are fabricated using non-planar transistor technology. The present disclosure contemplates multichip package module 150 generating multichip, hybrid node packages based on any suitable transistor technology so long as the multichip, hybrid node packages provide systems that function and perform as specified by a customer's single chip design.

FIGS. 5A-5D are various fragmentary cross-sectional views of multichip, hybrid node packages of a chipset generated by disassembling a single chip design for a single chip of a single process node and integrated into a stacked chip package structure according to various aspects of the present disclosure. In some embodiments, multichip package module 150 generates the stacking package arrangements for the chipset. In FIGS. 5A-5D, the chipset includes a CPU chiplet 410A, a GPU chiplet 410B, an SRAM chiplet 410C (which, in some embodiments, is configured to provide L1 cache), an SRAM chiplet 410D (which, in some embodiments, is configured to provide L2 cache), an Internet chiplet 410E, and an RF chiplet 410F. FIGS. 5A-5D have been simplified for the sake of clarity to better understand the inventive concepts of the present disclosure. Additional features can be added in multichip, hybrid node packages, and some of the features described below can be replaced, modified, or eliminated in other embodiments of multichip, hybrid node packages.

Figure 5A:
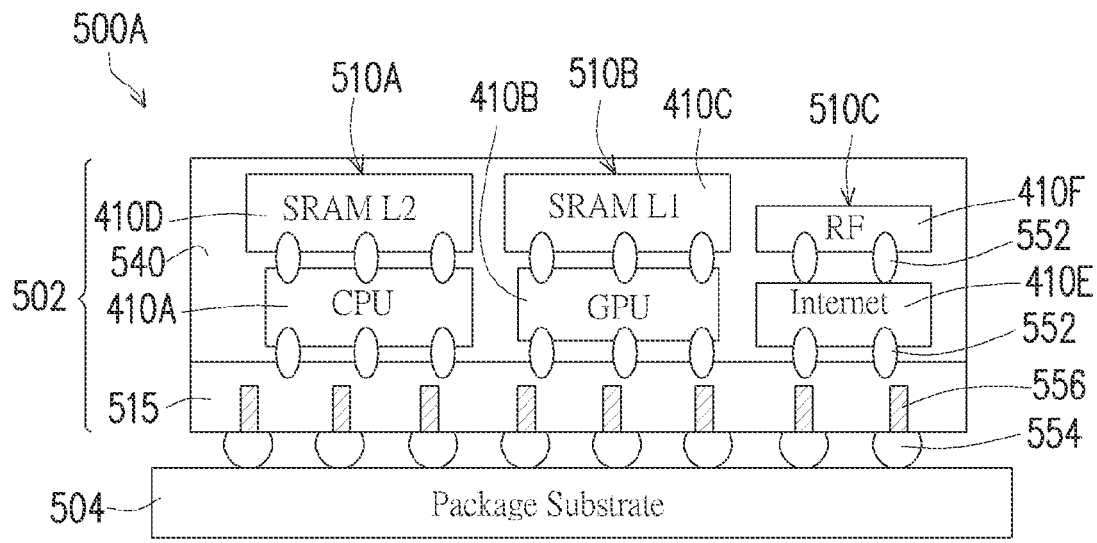
FIGS. 5A-5D are various fragmentary cross-sectional views of multichip, hybrid node packages according to various aspects of the present disclosure.

Turning to FIG. 5A, a CoWoS package 500A (i.e., a multichip, hybrid node package), in portion or entirety, is provided by arranging the chipset using CoWoS multi-chip packaging technology according to various aspects of the present disclosure. CoWoS package 500A includes a chip-on-wafer (CoW) structure 502 attached to a substrate 504 (e.g., a package substrate). CoW structure 502 includes at least one chiplet stack, such as a chiplet stack 510A, a chiplet stack 510B, and a chiplet stack 510C, attached to an interposer 515. In FIG. 5A, chiplet stacks 510A-510C each include two chiplets. For example, chiplet stack 510A includes CPU chiplet 410A and SRAM chiplet 410D, chiplet stack 510B includes GPU chiplet 410B and SRAM chiplet 410C, and chiplet stack 510C includes chiplet 410E and chiplet 410F. Various bonding mechanisms can be implemented in CoWoS package 500A. For example, each of chiplets 410A-410E is bonded, attached, and/or interconnected to a respective one of chiplets 410A-410E by respective microbumps 552 (also referred to as microbonds, µbumps, and/or µbonds), each of chiplet stacks 510A-510C is bonded, attached, and/or interconnected to interposer 515 by respective microbumps 552, and interposer 515 is bonded, attached, and/or interconnected to substrate 504 by controlled collapse chip connections (referred to hereinafter as C4 bonds 554) (e.g., solder bumps and/or solder balls). In some embodiments, chiplets 410A-410E may be physically and/or electrically connected to one another and/or interposer 515 by microbumps 552. In some embodiments, interposer 515 is physically and/or electrically connected to substrate 504 by C4 bonds 554 and through silicon vias (TSVs) 556.

Figure 5B:
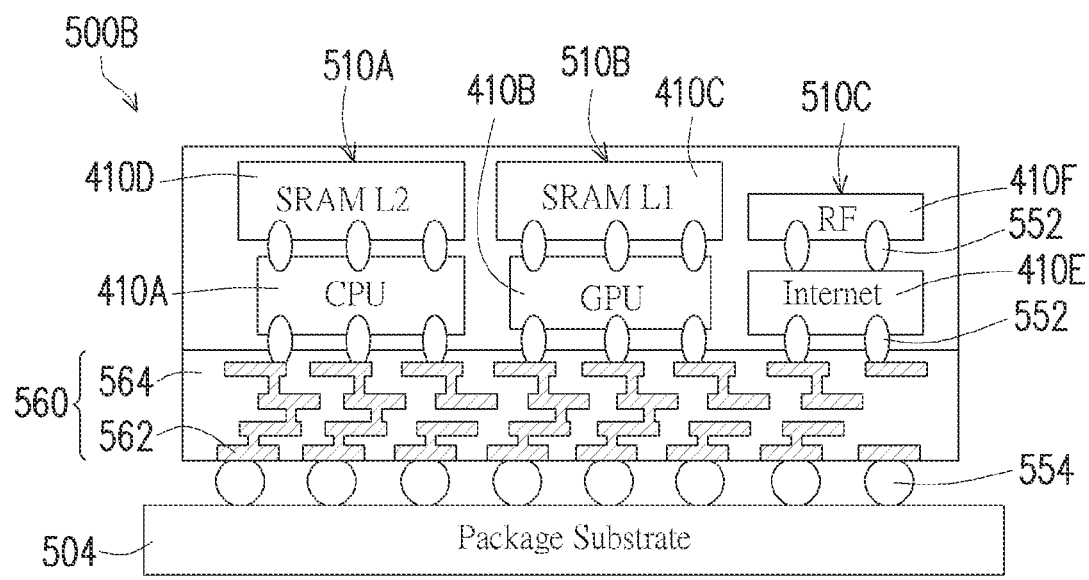

Turning to FIG. 5B, an InFO package 500B (i.e., a multichip, hybrid node package), in portion or entirety, is provided by arranging the chipset using InFO multi-chip packaging technology according to various aspects of the present disclosure. In FIG. 5B, chiplets stacks 510A-520C are attached to a redistribution layer (RDL) 560, which is attached to substrate 504. RDL 560 includes conductive, metal lines 562 (e.g., copper (Cu) lines) configured for routing electrical signals disposed in a dielectric layer 564. Various bonding mechanisms can be implemented in InFO package 500B. For example, each of chiplets 410A-410E is bonded, attached, and/or interconnected to a respective one of chiplets 410A-410E by respective microbumps 552, each of chiplet stacks 510A-510C is bonded, attached, and/or interconnected to RDL 560 by respective microbumps 552, and RDL 560 is bonded, attached, and/or interconnected to substrate 504 by C4 bonds 554. In some embodiments, chiplets 410A-410E may be physically and/or electrically connected to one another and/or RDL 560 by microbumps 552, and RDL 560 is physically and/or electrically connected to substrate 504 by C4 bonds 554.

Figure 5C:
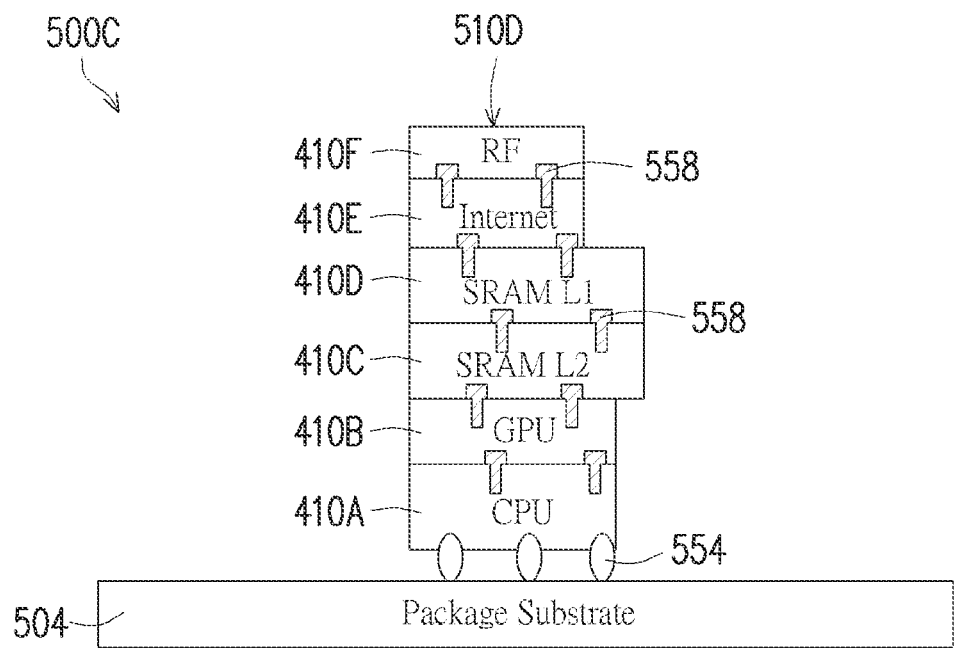

Turning to FIG. 5C, an SoIC package 500C (i.e., a multichip, hybrid node package), in portion or entirety, is provided by arranging the chipset using SoIC multi-chip packaging technology according to various aspects of the present disclosure. SoIC package 500C includes one chiplet stack 510D, which vertically stacks chiplets 410A-410F. Each of chiplets is directly bonded face-to-face and/or face-to-back with one or more other chiplets by hybrid bonds 558 (e.g., copper-to-copper bonds, TSV, direct pad bonding, etc.). For example, in chiplet stack 510D, GPU chiplet 410B is directly bonded with CPU chiplet 410A and SRAM chiplet 410C, which is directly bonded with SRAM chiplet 410D, which is directly bonded with Internet chiplet 410E, which is directly bonded with RF chiplet 410F. Chiplet stack 510D (in particular, CPU chiplet 410A) is bonded to substrate 504 by C4 bonds 554.

Figure 5D:
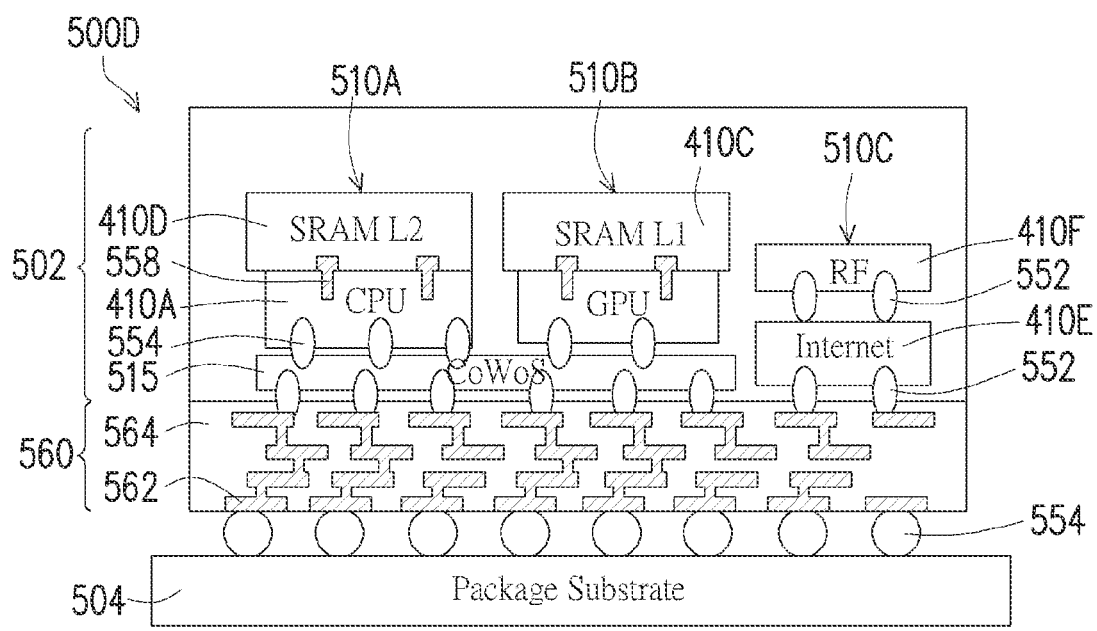

Turning to FIG. 5D, a multichip, hybrid node package 500D, in portion or entirety, is provided by arranging the chipset using a combination of multichip packaging technologies, such as CoWoS, InFo, and SoIC multi-chip packaging technology according to various aspects of the present disclosure. In multichip, hybrid node package 500D, chiplet stack 510A and chiplet stack 510B are configured as SoICs (e.g., CPU chiplet 410A and SRAM chiplet 410D are bonded, attached, and/or interconnected by hybrid bonds 558, and GPU chiplet 410B and SRAM chiplet 410C are bonded, attached, and/or interconnected by hybrid bonds 558), which are arranged side-by-side and bonded, attached, and/or interconnected to interposer 515 by C4 bonds 554, which is bonded, attached, and/or interconnected to RDL 560 by C4 bonds 554 and/or TSVs 556 (not shown) to form a CoWoS structure. Further, chiplet stack 510C (e.g., RF chiplet 410F abashed to Internet chiplet 410E by C4 bonds 554) is bonded, attached, and/or interconnected to RDL 560 to form an InFo structure. RDL 560 is bonded, attached, and/or interconnected to substrate 504 by C4 bonds 554. The various bonds can provide physical and/or electrical connection between the various components of multichip, hybrid node package 500D.

The present disclosure contemplates embodiments where chiplet stacks 510A-510D include more or less chiplets than depicted, chiplet stacks 510A-510D include the same number of chiplets, chiplet stacks 510A-510D include different numbers of chiplets, chiplet stacks 510A-510D include the same chiplet types (e.g., each chiplet stack includes a memory chiplet attached to a logic chiplet, which is attached to interposer 515), and/or chiplet stacks 510A-510D include different chiplet types.

Figure 6:
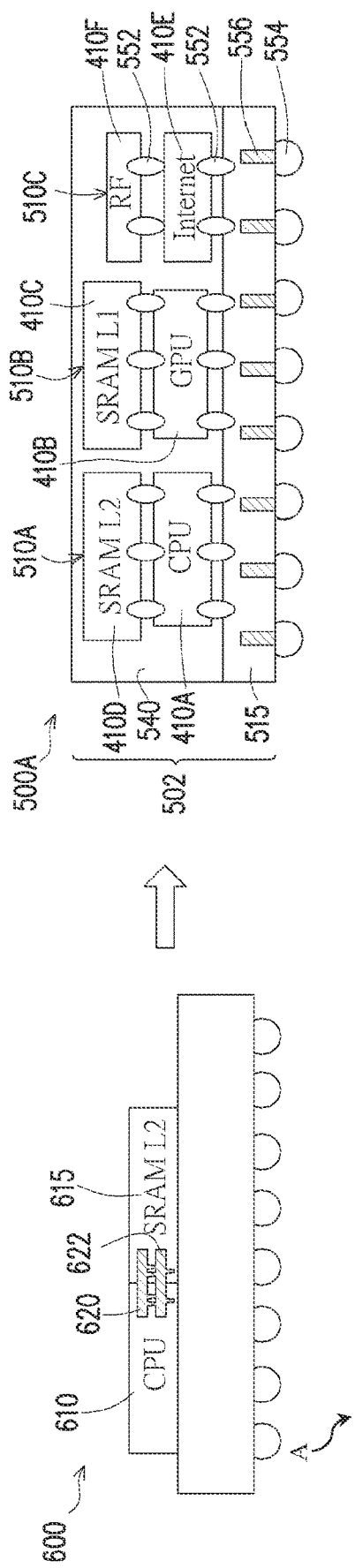
FIG. 6 compares testing performance of a single chip and a multichip, hybrid node package providing the same system according to various aspects of the present disclosure.

Interconnections in a system fabricated as a multichip, hybrid node package may exhibit different resistance values than resistance values observed in the system when fabricated as a single chip. However, overall circuit probe (CP) testing performance observed in the system provided by the multichip, hybrid node package remains the same as that observed in the system when provided by the single chip. FIG. 6 compares CP testing performance between a single chip 600 (e.g., an SoC) and a multichip, hybrid node package, such as CoWoS package 500A, according to various aspects of the present disclosure. CoWoS package 500A may be generated by multichip, hybrid packaging module 150 receiving, disassembling, and integrating a single chip design corresponding with single chip 600. Single chip 600 and CoWoS package 500A provide the same systems. But, in contrast to CoWoS package 500A, each unit of single chip 600 is fabricated on a single wafer and electrically and/or physically connected laterally by metal interconnections, such as metal lines of an MLI feature. For example, single chip 600 includes circuitry that provides a CPU 610 and a memory 615 (e.g., an SRAM for providing L2 cache), which are laterally oriented and interconnected by metal lines of an MLI feature, such as a top metal line 620 and an intermetal line 622, instead of bonding, such as by microbonds 552 and/or C4 bonds. Table A provides testing information for single chip 600, and Table B provides testing information for CoWoS package 500A. From Table A and Table B, it can be seen that resistance values of interconnections between circuits having different functions of single chip 600 (e.g., resistance values observed at top metal lines 620 and/or intermetal lines 622 between CPU 610 and memory 615) are less than resistance values of interconnections between chiplets having different functions of CoWoS package 500A (e.g., resistance values observed at mirobumps 552 between CPU chiplet 410A and SRAM chiplet 410D, which correspond with CPU 610 and memory 615, respectively). Despite such resistance differences, electrical measurements observed during CP testing for both single chip 600 and CoWoS package 500A comply with the design specifications, such as customer defined electrical parameters.

Figure 7:
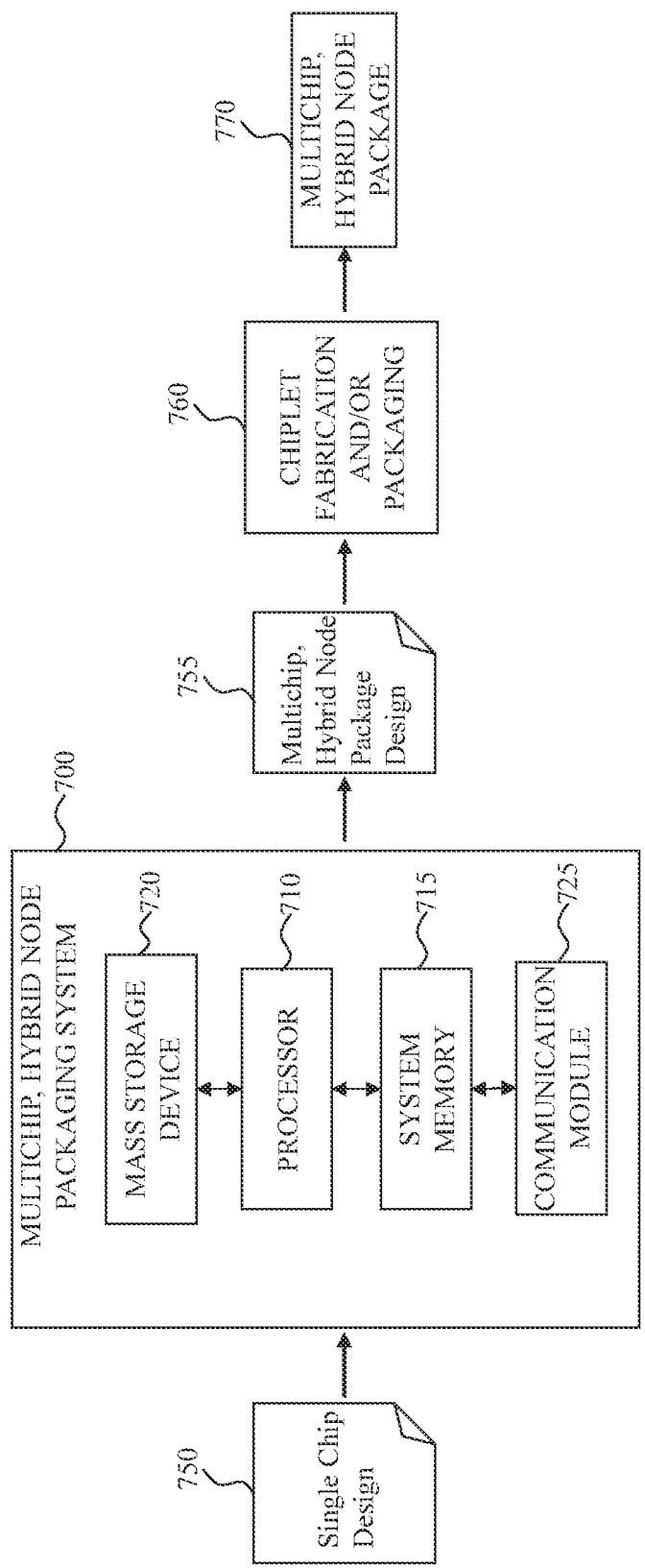
FIG. 7 is a multichip, hybrid node packaging system, in portion or entirety, that implements multichip, hybrid node packaging methods, such as the method of FIG. 1, to provide multichip, hybrid node packages according to various aspects of the present disclosure.

Turning to FIG. 7, FIG. 7 is a block diagram of a multichip, hybrid node packaging system 700, in portion or entirety, according to various aspects of the present disclosure. Multichip, hybrid node packaging system 700 is operable to perform the functionality described herein, such as that associated with multichip, hybrid node packaging module 150 described herein. Multichip, hybrid node packaging system 700 is an information handling system, such as a computer, server, workstation, or other suitable device. Multichip, hybrid node packaging system 700 includes a processor 710 that is communicatively coupled to a system memory 715, a mass storage device 720, and a communication module 725. System memory 715 provides processor 710 with non-transitory, computer-readable storage to facilitate execution of computer instructions by the processor. Examples of system memory 715 may include random access memory (RAM) devices, such as dynamic RAM (DRAM), synchronous DRAM (SDRAM), solid state memory devices, and/or a variety of other memory devices known in the art. Computer programs, instructions, and data are stored within mass storage device 720. Examples of mass storage device 720 may include hard discs, optical disks, magneto-optical discs, solid-state storage devices, and/or a variety of other mass storage devices. Communication module 725 is operable to communicate information such as IC design layout files with other components of an IC manufacturing system, such as design house, a mask house, a semiconductor foundry, an IC packaging facility, and/or other entity involved with IC fabrication and/or packaging. Examples of communication module 725 may include Ethernet cards, 802.11 WiFi devices, cellular data radios, and/or other suitable devices known in the art.

In operation, multichip, hybrid node packaging system 700 is configured to manipulate a single chip design 750 for a single chip fabricated by a single process node and generate a multichip, hybrid node package design 755 as described herein. In some embodiments, multichip, hybrid node package design 755 is transmitted to chip fabrication and/or packaging 760, where chiplets are fabricated and/or are packaged as specified in multichip, hybrid node package design 755, thereby providing a multichip, hybrid node package 770 that meets the design specifications corresponding with single chip design 750. Further, multichip, hybrid node packaging system 700 may include additional and/or different components in alternative embodiments. Additionally, and in accordance with various embodiments, multichip, hybrid node packaging system 700 (or an information handling system in communication with multichip, hybrid node packaging system 700) may implement the artificial intelligence techniques (e.g., machine learning), data mining techniques, and/or simulation techniques, and/or associated functions described herein used for generating multichip, hybrid node package designs from single chip designs.

The various embodiments disclosed herein, including aspects of method 10 and generation of multichip, hybrid node package 100B, multichip, hybrid node package 100C, multichip, hybrid node packages 300A-300C, and multichip, hybrid node packages 500A-500D, may be implemented on any suitable computing system, such multichip, hybrid node packaging system 700 described in association with FIG. 7. In some embodiments, aspects of the method 10 may be executed on a single computer, local area networks, client-server networks, wide area networks, internets, hand-held and other portable and wireless devices and networks. Such a system architecture may take the form of an entirely hardware embodiment, an entirely software embodiment, or an embodiment containing both hardware and software elements. By way of example, hardware may include at least processor-capable platform, such as client-machines (also known as personal computers or servers), and hand-held processing devices (such as smart phones, personal digital assistants (PDAs), or personal computing devices (PCDs), for example). In addition, hardware may include any physical device that is capable of storing machine-readable instructions, such as memory or other data storage devices. Other forms of hardware include hardware sub-systems, including transfer devices such as modems, modem cards, ports, and port cards, for example. In various examples, software may include any machine code stored in any memory medium, such as RAM or ROM, and machine code stored on other devices (such as floppy disks, flash memory, or a CD-ROM, for example). In some embodiments, software may include source or object code, for example. In addition, software may encompass any set of instructions capable of being executed in a client machine or server.

Furthermore, embodiments of the present disclosure can take the form of a computer program product accessible from a tangible computer-usable or computer-readable medium providing program code for use by or in connection with a computer or any instruction execution system. For the purposes of this description, a tangible computer-usable or computer-readable medium may be any apparatus that can contain, store, communicate, propagate, or transport the program for use by or in connection with the instruction execution system, apparatus, or device. The medium may be an electronic, magnetic, optical, electromagnetic, infrared, a semiconductor system (or apparatus or device), or a propagation medium.

In some embodiments, defined organizations of data known as data structures may be provided to enable one or more embodiments of the present disclosure. For example, a data structure may provide an organization of data, or an organization of executable code. In some examples, data signals may be carried across transmission media and store and transport various data structures and may thus be used to transport an embodiment of the present disclosure.

The present disclosure provides for many different embodiments. An exemplary method includes receiving a single chip design for a single chip of a single process node, wherein the single chip design has design specifications and generating a multichip, hybrid node design from the single chip design by disassembling the single chip design into chiplets having different functions and different process nodes based on the design specifications and integrating the chiplets into a stacked chip package structure. In some embodiments, a first system provided by the single chip design is substantially the same as a second system provided by the multichip, hybrid node design. In some embodiments, the design specifications include power, performance, area, and cost (PPAC) specifications. In some embodiments, the single chip design has a first fabrication cost and the multichip, hybrid node design has a second fabrication cost that is less than the first fabrication cost. In some embodiments, the single chip design has a first area and the multichip, hybrid node design has a second area that is less than the first area.

In some embodiments, the stacked chip package structure is a chip-on-wafer-on-substrate (CoWoS) package, and the integrating the chiplets into the stacked chip package structure includes arranging the chiplets into at least one chip stack of the CoWoS package. In some embodiments, the stacked chip package structure is an integrated-fan-out (InFo) package, and the integrating the chiplets into the stacked chip package structure includes arranging the chiplets into at least one chip stack of the InFo package. In some embodiments, the stacked chip package structure is a system on integrated chip (SoIC) package, and the the integrating the chiplets into the stacked chip package structure includes arranging the chiplets into at least one chip stack of the SoIC package. In some embodiments, the stacked chip package structure is a hybrid package, and the integrating the chiplets into the stacked chip package structure includes arranging the chiplets into a CoWoS structure, an InFo structure, and an SoIC structure.

In some embodiments, the method further includes fabricating the chiplets, wherein the chiplets include a first chiplet of a first process node having a first function and a second chiplet having a second function of a second process node, wherein the first function is different than the second function and the first process node is different than the second process node.

Another exemplary method includes receiving a stacking package arrangement for a chipset generated by disassembling a single chip design for a single chip of a single process node into chiplets having different functions and different process nodes. The chipset meets design specifications that correspond with the single chip design of the single chip. The method further includes assembling and stacking the chiplets in a stacked chip package structure based on the stacking package arrangement. In some embodiments, the assembling and stacking includes arranging the chiplets into at least one chip stack of a chip-on-wafer-on-substrate (CoWoS) package. In some embodiments, the assembling and stacking includes arranging the chiplets into at least one chip stack of an integrated-fan-out (InFo) package. In some embodiments, the assembling and stacking includes arranging the chiplets into at least one chip stack of a system on integrated chip (SoIC) package. In some embodiments, the assembling and stacking includes arranging the chiplets into at least one chip stack of a hybrid package that includes a CoWoS structure, an InFo structure, and an SoIC structure. In some embodiments, the assembling and stacking the chiplets in the stacked chip package structure based on the stacking package arrangement includes stacking a first memory chiplet on a first logic chiplet, stacking a second memory chiplet on a second logic chiplet, and stacking a first communications chiplet on a second communications chiplet.

Another exemplary method includes receiving a single chip design for a single chip of a single process node, where the single chip design has design specifications, disassembling the single chip design into chiplet functions, selecting chiplets based on the chiplet functions, selecting a stacked chip package structure for the chiplets, and adjusting the chiplets, process nodes of the chiplets, and stacking arrangement of the chiplets until generating a multichip, hybrid node design that meets the design specifications. In some embodiments, the selecting the chiplets based on the chiplet functions includes selecting a first combination of chiplets and the adjusting the chiplets and the adjusting process nodes of the chiplets includes selecting a second combination of chiplets. In some embodiments, the adjusting the stacking arrangement of the chiplets includes rearranging the chiplets. In some embodiments, the adjusting the stacking arrangement of the chiplets includes incorporating the chiplets into a different package type.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
receiving a single chip design for a single chip of a single process node, wherein the single chip design has design specifications; and
generating a multichip, hybrid node design from the single chip design by:
disassembling the single chip design into chiplets having different functions and different process nodes based on the design specifications, and
integrating the chiplets into a stacked chip package structure.

2. The method of claim 1, wherein a first system provided by the single chip design is substantially the same as a second system provided by the multichip, hybrid node design.

3. The method of claim 1, wherein the design specifications include power, performance, area, and cost (PPAC) specifications.

4. The method of claim 1, wherein the single chip design has a first fabrication cost and the multichip, hybrid node design has a second fabrication cost that is less than the first fabrication cost.

5. The method of claim 1, wherein the single chip design has a first area and the multichip, hybrid node design has a second area that is less than the first area.

6. The method of claim 1, wherein the stacked chip package structure is a chip-on-wafer-on-substrate (CoWoS) package, and the integrating the chiplets into the stacked chip package structure includes arranging the chiplets into at least one chip stack of the CoWoS package.

7. The method of claim 1, wherein the stacked chip package structure is an integrated-fan-out (InFo) package, and the integrating the chiplets into the stacked chip package structure includes arranging the chiplets into at least one chip stack of the InFo package.

8. The method of claim 1, wherein the stacked chip package structure is a system on integrated chip (SoIC) package, and the the integrating the chiplets into the stacked chip package structure includes arranging the chiplets into at least one chip stack of the SoIC package.

9. The method of claim 1, wherein the stacked chip package structure is a hybrid package, and the integrating the chiplets into the stacked chip package structure includes arranging the chiplets into a CoWoS structure, an InFo structure, and an SoIC structure.

10. The method of claim 1, further comprising fabricating the chiplets, wherein the chiplets include a first chiplet of a first process node and having a first function and a second chiplet of a second process node and having a second function, wherein the first function is different than the second function and the first process node is different than the second process node.

11. A method comprising:
receiving a stacking package arrangement for a chipset generated by disassembling a single chip design for a single chip of a single process node into chiplets having different functions and different process nodes, wherein the chipset meets design specifications that correspond with the single chip design of the single chip; and
assembling and stacking the chiplets in a stacked chip package structure based on the stacking package arrangement.

12. The method of claim 11, wherein the assembling and stacking includes arranging the chiplets into at least one chip stack of a chip-on-wafer-on-substrate (CoWoS) package.

13. The method of claim 11, wherein the assembling and stacking includes arranging the chiplets into at least one chip stack of an integrated-fan-out (InFo) package.

14. The method of claim 11, wherein the assembling and stacking includes arranging the chiplets into at least one chip stack of a system on integrated chip (SoIC) package.

15. The method of claim 11, wherein the assembling and stacking includes arranging the chiplets into at least one chip stack of a hybrid package that includes a CoWoS structure, an InFo structure, and an SoIC structure.

16. The method of claim 11, wherein the assembling and stacking the chiplets in the stacked chip package structure based on the stacking package arrangement includes:
stacking a first memory chiplet on a first logic chiplet;
stacking a second memory chiplet on a second logic chiplet; and
stacking a first communications chiplet on a second communications chiplet.

17. A method comprising:
receiving a single chip design for a single chip of a single process node, wherein the single chip design has design specifications;
disassembling the single chip design into chiplet functions;
selecting chiplets based on the chiplet functions;
selecting a stacked chip package structure for the chiplets; and adjusting the chiplets, process nodes of the chiplets, and a stacking arrangement of the chiplets until generating a multichip, hybrid node design that meets the design specifications.

18. The method of claim 17, wherein:
the selecting the chiplets based on the chiplet functions includes selecting a first combination of chiplets; and
the adjusting the chiplets and the adjusting the process nodes of the chiplets includes selecting a second combination of chiplets.

19. The method of claim 17, wherein the adjusting the stacking arrangement of the chiplets includes rearranging the chiplets.

20. The method of claim 17, wherein the adjusting the stacking arrangement of the chiplets includes incorporating the chiplets into a different package type.

* * * * *